United States Patent [19]

Avitan

[11] Patent Number: 5,264,763
[45] Date of Patent: Nov. 23, 1993

[54] OPTIMIZING SYSTEM FOR VEHICLE TRACTION MOTORS

[75] Inventor: Isaac Avitan, Sioux City, Iowa
[73] Assignee: Schaeff Inc., Sioux City, Iowa
[21] Appl. No.: 968,127
[22] Filed: Oct. 29, 1992
[51] Int. Cl.⁵ ............................................. H02P 5/17
[52] U.S. Cl. .................... 318/139; 388/801; 388/803; 388/804
[58] Field of Search ............... 318/139; 388/800, 801, 388/803, 804, 806, 811, 815; 180/65.1, 65.5, 65.8

[56] References Cited

U.S. PATENT DOCUMENTS

| | | | |
|---|---|---|---|
| 3,686,549 | 8/1972 | Winebrener | 318/139 |
| 3,694,715 | 9/1972 | Van Der Linde et al. | |
| 4,079,301 | 3/1978 | Johnson, III | |
| 4,090,114 | 5/1978 | Thompson | 318/139 |
| 4,188,569 | 2/1980 | Campbell | 318/139 X |
| 4,264,846 | 4/1981 | Sauer et al. | |
| 4,410,842 | 10/1983 | Owen | 318/139 |
| 5,039,992 | 8/1991 | Avitan | |
| 5,165,006 | 11/1992 | Nagano et al. | 388/803 |

Primary Examiner—Bentsu Ro
Attorney, Agent, or Firm—Natter & Natter

[57] ABSTRACT

The present invention features a system for optimizing control of separately excited shunt-wound dc motors, where optimization is achieved through microprocessor-based independent PWM control of a chopper (armature) and an H-bridge (field). Connected to the armature is an armature voltage amplifier for varying the applied armature voltage. A field voltage amplifier is also provided for determining the direction of motor rotation and varying the voltage applied to the field winding. A first sensor is connected to the driven wheel(s) of the vehicle in order to determine the wheel rotational speed. A second sensor is connected to the armature circuit in order to determine the armature current. A third sensor is connected to the field circuit in order to determine the field current. A decoupling controller uses the wheel speed and armature current information, and adjusts the armature voltage and the field voltage. An optimal controller uses the wheel speed, field current and armature current information, and adjusts the armature voltage and the field current.

8 Claims, 5 Drawing Sheets

OPTIMIZING SYSTEM FOR VEHICLE TRACTION MOTORS

RELATED APPLICATION

The present application is related to U.S. patent application, Ser. No. 07/963,138, filed concurrently herewith for "SPEED-DEPENDENT TRACTION MOTOR CONTROLLER FOR VEHICLES".

BACKGROUND OF THE INVENTION

The present invention relates to dc motor optimizing systems and, more particularly, to optimizing systems for dc motors having separately excited armature and field windings.

Heavy duty material handling vehicles provided with electric motors typically use a lead-acid battery that can weigh many thousands of pounds. Besides providing the energy source to the vehicle, in many instances the battery also provides vehicle counterbalance.

The ratio of the load weight to the gross unloaded vehicle weight of industrial lift trucks is extremely important. For example, if an unladen vehicle weighs 12,000 lbs, and the maximum load weight it can carry is 4,000 lbs, then the gross unladen/laden weight may vary from as little as 12,000 to as much as 16,000 lbs. This represents a change of 33% in motor torque requirements. Moreover, the vehicle must be able to maneuver on loading ramps, further increasing the motor torque requirements. For these and other reasons, a control system capable of extracting precise and efficient work from the vehicle is desirable.

The main motive element of this type of vehicle, referred to as the traction system, usually consists of a series-wound dc motor coupled to a gear reducer and drive wheel.

The rotational direction of the series-wound dc motor is controlled by the polarity orientation of the field winding with respect to the armature. Generally, the field winding orientation is controlled through a pair of contactors, such that when power is applied across the field-armature combination, the motor is caused to rotate in the desired direction.

The series-wound dc motor, heretofore used extensively in industrial lift trucks, features one very important characteristic: it has high torque at zero speed. This is extremely useful in providing the necessary starting torque.

Typically, the field-armature combination is controlled as a single unit. Motor speed regulation is most often achieved through voltage switching utilizing such power semiconductor technologies as silicon-controlled-rectifiers (SCRs). The voltage drop associated with the SCR as well its duty cycle limit impose a speed limit on the motor.

However, a series dc motor may operate only along its characteristic commutation curve limit. Since changing torque loading arises from variations in load capacities, travel path conditions and grade variations, motor speed variations occur.

With the proper controls, the use of a shunt-wound dc motor under independent field and armature control can provide distinct advantages over conventional series-wound dc motors for lift truck applications.

The separately excited dc motor represents a highly coupled multi-input, multi-output, non-linear, dynamic system or plant. It is highly coupled in the sense that, when one of its inputs is changed, all of the outputs are affected. This is undesirable, since the purpose of control is to knowingly and intentionally affect the desired output(s) only, without altering other output states.

U.S. Pat. No. 4,079,301 issued to Johnson, III discloses a dc motor control circuit having separately excited armature and field windings. The control circuit is operable in both the constant torque and constant horsepower modes. The transfer characteristics of the circuit provide high gain at low frequencies and low gain at higher frequencies. The circuit can further reduce the gain at low frequencies when motor operation switches from the constant torque mode to the constant horsepower mode.

U.S. Pat. No. 3,694,715 issued to Van Der Linde et al discloses a contactless dc motor reversing circuit. The current from a variable frequency, pulsed dc source is applied to the series field by a pair of solid state switching devices for forward motor rotation. A second pair of solid state switching devices applies current for reverse motor rotation. Common to both switching devices is a third switching device which normally carries the induced armature current between pulses. It is de-energized during transfer of conduction between both pairs of switching devices, assuring that the blocking state of one pair occurs before the second pair is turned on.

U.S. Pat. No. 4,264,846 issued to Sauer et al discloses a speed control braking circuit for a dc motor. The field and armature currents are independent of each other to allow motor operation in the field weakening region. The armature current is set by a pulsing dc element. The field winding is contained in a series circuit with a switch which is connected in parallel with the dc element. Shunted across the field winding is a field current bypass diode.

U.S. Pat. No. 5,039,924, issued to the present applicant and hereby incorporated by reference, discloses a system for optimizing control of separately excited shunt-wound dc motors, where optimization is achieved through microprocessor-based independent pulse-width-modulation (PWM) control of a chopper (armature) and an H-bridge (field). Connected to the armature is an armature voltage amplifier for varying the applied armature voltage. A field voltage amplifier is also provided for varying the voltage applied to the field winding. A first sensor is connected to the motor armature in order to determine the motor rotational speed. A second sensor is connected to the armature circuit in order to determine the armature current. A third sensor is connected to the field circuit in order to determine the field current. An optimal controller uses the motor speed, field current and armature current information, and adjusts the armature voltage and the field current.

Unfortunately, monitoring motor speed is an indirect method of determining the speed of the vehicle itself. Moreover, since the speed of the traction motor is not always linearly proportional to the actual speed of the vehicle (e.g., when turning), attempting to control the motor based solely on the speed thereof is not necessarily the most accurate vehicle speed control method.

Moreover, connecting or attaching an encoder to the armature of the motor is often problematical. Not only must space considerations be taken into account, but heat dissipation techniques must be employed.

It would be advantageous to provide a system that optimizes for motor losses.

It would also be advantageous to provide a motor optimizing system capable of producing variable torque while maintaining constant speed.

It would also be advantageous to provide a system for controlling a motor based on data representative of motor speed, but not to require motor speed measurement at or near the motor itself.

It would also be advantageous to provide a system for controlling a motor that is based on direct speed measurement of the wheel(s) driven by that motor.

It would still further be advantageous to provide a system in which the optimizing control is achieved using software.

SUMMARY OF THE INVENTION

A separately excited dc motor is the main motive mechanism replacement for the traditional series-wound dc motor. Independent field and armature control enables control of a motor anywhere along, and below its characteristic commutation curve limit. Independent field control extends controllability of the motor, thereby making the system less sensitive to variations in load capacities, travel path conditions and grade variations. Since the dc motor's field windings require far less current than its series-wound counterpart, it is economically feasible to apply full variability (voltage switching) field control.

Field and armature voltage switching is achieved through the utilization of power transistors instead of traditional SCRs, which are limited in switching speed and require additional circuitry due to their non-self-commutating characteristics.

In accordance with the present invention, there is provided a system for optimizing control of separately excited shunt-wound dc motors, where optimization is achieved through microprocessor-based independent pulse-width-modulation (PWM) control of a chopper (armature) and an H-bridge (field). Connected to the armature is an armature voltage amplifier for varying the applied armature voltage. A field voltage amplifier is also provided for varying the voltage applied to the field winding. A first sensor is connected to one or more driven wheels in order to determine the wheel speed. A second sensor is connected to the armature circuit in order to determine the armature current. A third sensor is connected to the field circuit in order to determine the field current. An optimal controller uses the wheel speed, field current and armature current information, and adjusts the armature voltage and the field voltage.

The use of such a system results in many benefits including, but not limited to, optimized efficiency.

BRIEF DESCRIPTION OF THE DRAWINGS

A complete understanding of the present invention may be obtained by reference to the accompanying drawings, when taken in conjunction with the detailed description thereof and in which.

DESCRIPTION OF THE PREFERRED EMBODIMENT

Before describing the preferred embodiment of the present invention, it is desirable to discuss briefly the speed-torque characteristics of a series-wound dc motor.

Figure 1:
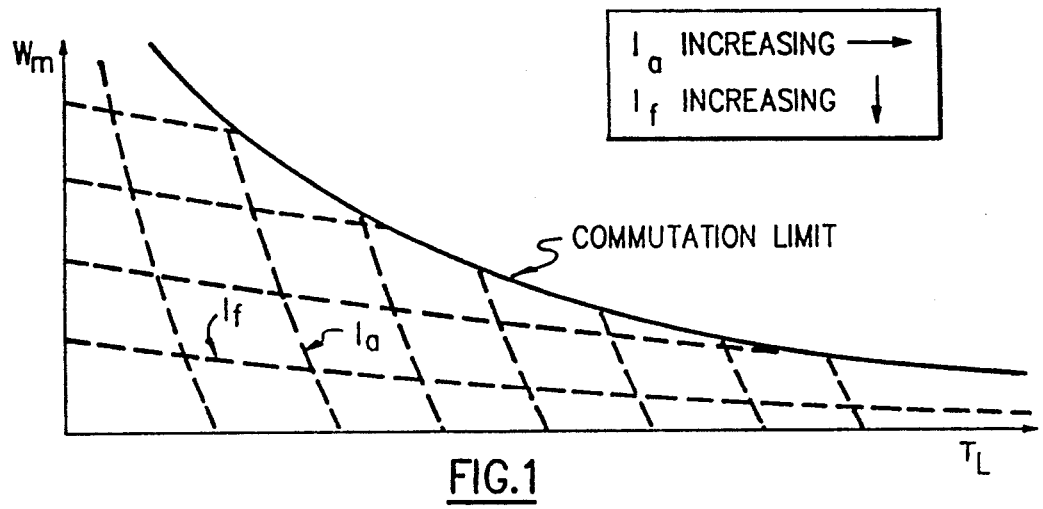
FIG. 1 is a graphical representation of a typical speed-torque relationship for series-wound dc motor.

Referring now to FIG. 1, there is shown a typical speed-torque graph for a series-wound dc motor showing the characteristic commutation limit, field current $I_f$ lines, and the armature current $I_a$ lines.

As discussed above, under conventional control a dc motor is restricted to operation along its characteristic commutation limit as represented by the motor rotational speed $\omega_m$ and motor shaft torque loading $\tau_L$. Hence, as can be seen from FIG. 1, a change in $\tau_L$ results in a change in $\omega_m$.

However, under independent and fully variable field and armature control, a change in $\tau_L$ may not necessarily result in a change in $\omega_m$. Rather, a control system in accordance with the present invention, and described in greater detail hereinbelow, can select a new motor operating point through $I_a$ and $I_f$ under the commutation limit resulting in an unchanged $\omega_m$ for the new torque loading value $\tau_L$.

Figure 2:
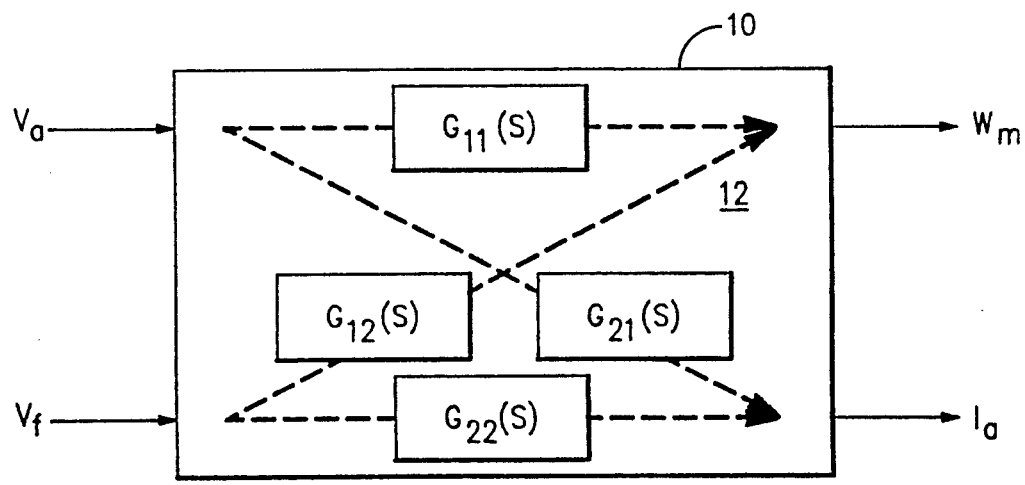
FIG. 2 is a block diagram of a multi-variable coupled system representation of a shunt-wound dc motor showing its particular internal channel transfer functions.

Referring now to FIG. 2, there is shown a block diagram of a multi-variable coupled system representation of a series- or shunt-wound dc motor.

An applied armature voltage $V_a$ and an applied field voltage $V_f$ are input to a motor 10. The physical transformations within the motor 10 may be suitably represented by cross channel transfer functions 12, to produce the motor rotational speed $\omega_m$ and armature current $I_a$ as outputs.

From an analysis of a series- or shunt-wound dc motor, it can be seen that the motor 10 consists of two first-order and two second-order dynamic systems. Such a motor system may be represented in the s-domain (Laplace transformation) by the transfer functions $G_{11}(s)$, $G_{12}(s)$, $G_{21}(s)$ and $G_{22}(s)$.

These transfer functions 12 are representative of the particular channels of the motor system defined as follows, $$G_{11}(s) = \omega_m(s)/V_a(s)$$

$$G_{12}(s) = \omega_m(s)/V_f(s)$$

$$G_{21}(s) = I_a(s)/V_a(s)$$

$$G_{22}(s) = I_a(s)/V_f(s)$$

where $G_{11}(s)$ and $G_{12}(s)$ are first-order systems, and $G_{21}(s)$ and $G_{22}(s)$ are second-order systems. Determination of these transfer functions 12 is analytical as well as experimental.

Figure 3:
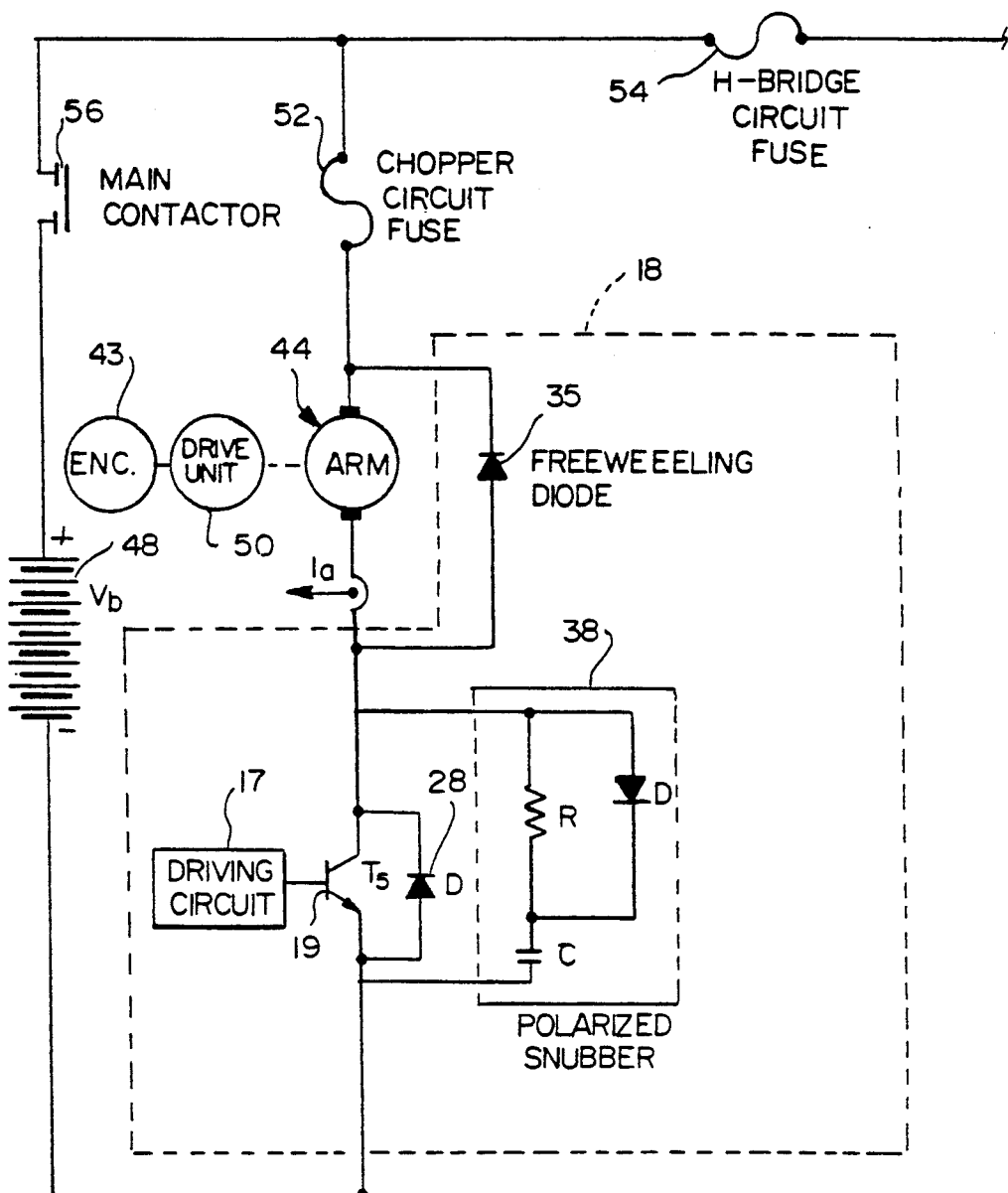
FIGS. 3A and 3B are a schematic diagram of the preferred embodiment of a dc motor control circuit in accordance with the present invention.
Figure 3:
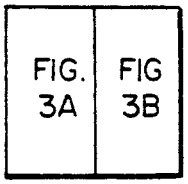
Figure 3B:
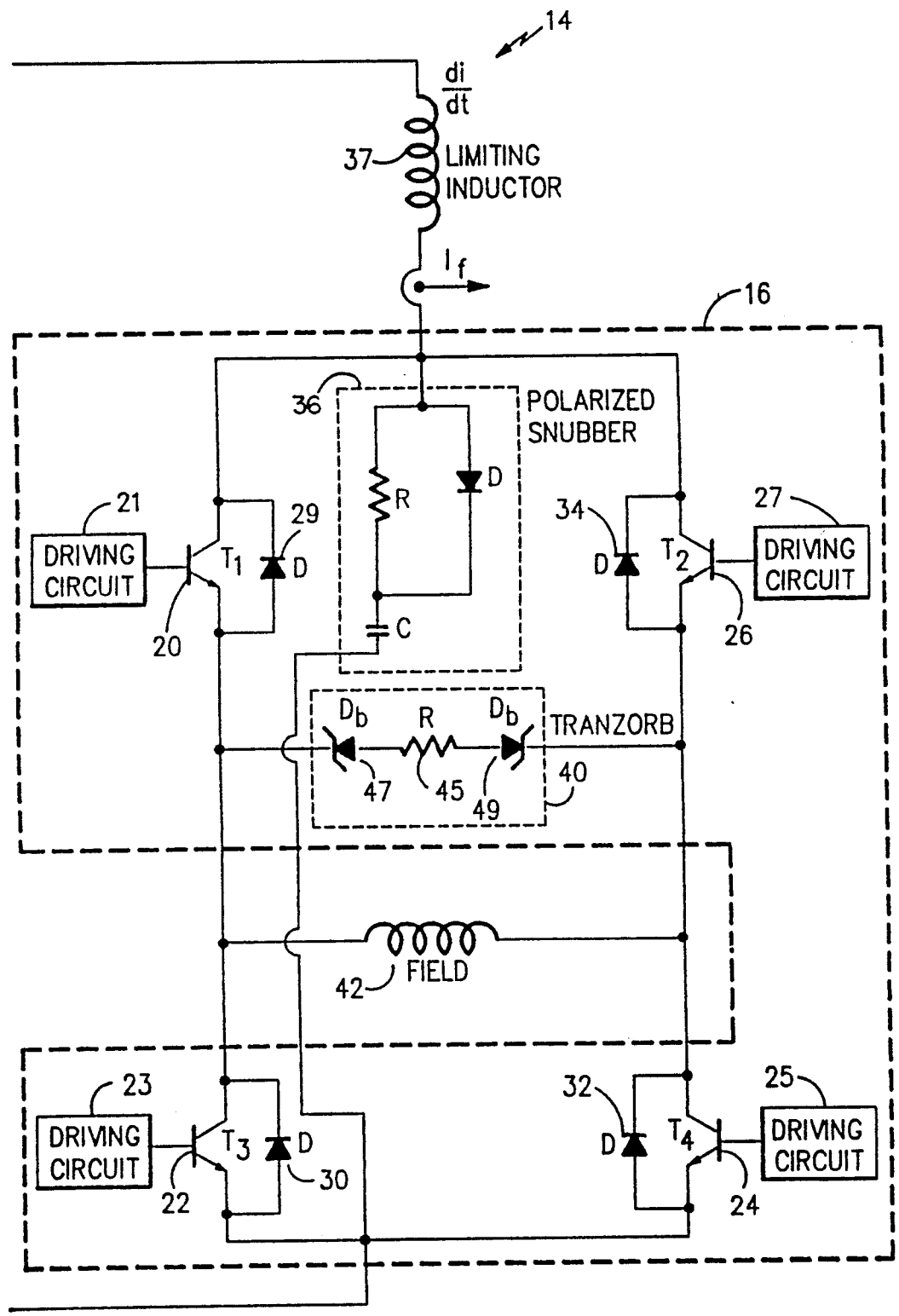

Referring now also to FIG. 3, consisting of FIGS. 3A and 3B, there is shown a schematic diagram of a dc motor control circuit, shown generally as reference numeral 14, which provides independent control of a wound dc motor by independently controlling its armature winding 44 and field winding 42. A vehicle drive unit 50 is driven by the motor and, more specifically, the motor armature 44. It should be understood that any suitable apparatus for imparting motion to a vehicle (e.g., a gear reduction box, a set of attached gears, or any combination of mechanical components that achieve non-slip gear reduction) could be used.

A suitable means for providing a feedback signal is indicated by encoder 43, which is preferably connected at the driven wheel(s), not shown, of drive unit 50. It will, of course, be obvious to those skilled in the art that any suitable encoder can be employed to perform the wheel speed sensing function.

Once the rotational wheel speed $\omega_W$ has been determined by encoder 43, by knowing the gear ratio N of motor-to-wheel, the rotational motor speed $\omega_m$ can be determined as follows:

$$\omega_m = \omega_w \cdot N$$

The primary components of motor control circuit 14 are a chopper circuit 18 which controls armature winding 44 and an H-Bridge circuit 16 which controls field winding 42. Two pairs of transistors 20, 24 and 26, 22 are connected to field winding 42, as shown.

Power is supplied to motor control circuit 14 by a dc battery 48. A main power contactor 56 is connected to battery 48 and chopper circuit 18 and H-Bridge circuit 16. Main contactor 56 enables system shut down should any system element fail.

A chopper circuit fuse 52 is connected between main contactor 56 and chopper circuit 18 to limit excessive current to chopper circuit 18. An H-Bridge circuit fuse 54 is connected between main contactor 56 and H-Bridge circuit 16 to limit excessive current to H-Bridge circuit 16.

Power regulation through armature winding 44 and field winding 42 is achieved through transistors 19 (in chopper circuit 18) and transistors 20, 22, 24 and 26 (in H-Bridge circuit 16). Control of transistors 19, 20, 22, 24 and 26 is achieved through driving circuits 17, 21, 23, 25 and 27, respectively. Motor rotation direction is dictated by the field winding 42 orientation with respect to the armature winding 44. Field winding 42 orientation is controlled by transistor pairs 22, 26 and 20, 24.

The ON-OFF ratio of transistors 19, 20, 22, 24 and 26 results in an average applied terminal voltage to armature winding 44 and field winding 42, respectively. As such, totally independent and fully variable control of armature winding 44 and field winding 42 is achieved.

Polarized snubber circuits 36 and 38 are provided in H-Bridge circuit 16 and chopper circuit 18 respectively to:

a) absorb switching power losses of transistors 19 (in chopper circuit 18), and transistors 20, 22, 24, 26 (in H-Bridge circuit 16);

b) prevent secondary breakdown due to localized heating effects during turn-on and turn-off of transistors; and c) prevent spurious turn-on of transistors due to dV/dt.

Free wheeling diodes 28, 29, 30, 32 and 34 provide a path for current upon turn-off of transistors 19, 20, 22, 24 and 26, respectively. Another free wheeling diode 35 is provided across armature 44, also to provide a current path when chopper circuit transistor 19 is turned off.

A dI/dt limiting inductor 3 is provided between H-Bridge circuit fuse 54 and H-Bridge circuit 16 to restrict the rate of rise of current through the H-Bridge circuit 16. This dI/dt limiting inductor 37 protects the H-Bridge circuit transistors 20, 22, 24 and 26 from armature voltage spikes. A pair of back-to-back breakdown diodes 47, 49 and a resistor 45 form a tranzorb 40 across field winding 42 to limit the field voltage.

A regeneration diode 46 connected across transistor 19 provides recirculation of load current back to battery 48 during part of the motor deceleration cycle.

Figure 4:
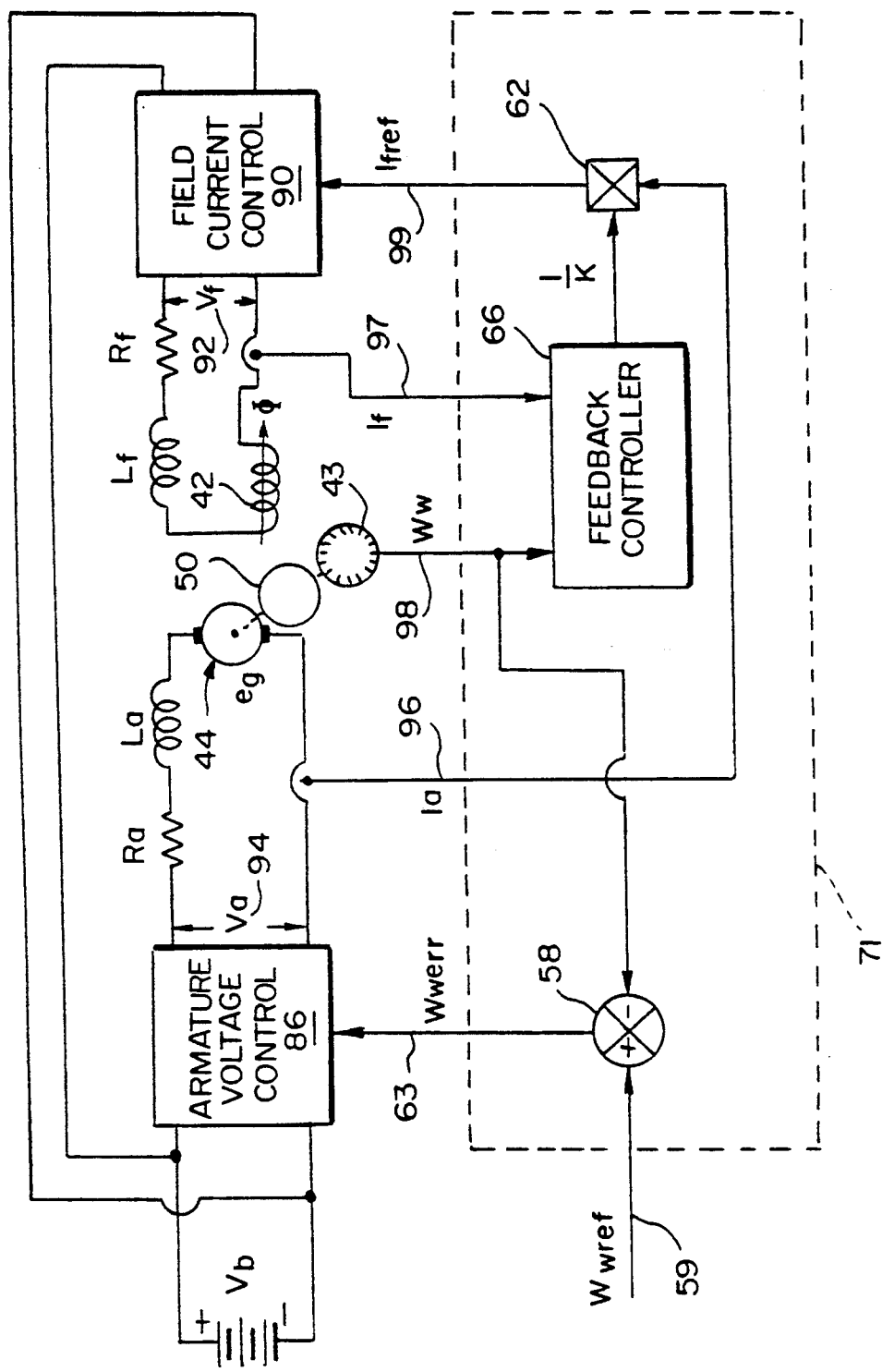
FIG. 4 is a block diagram of the optimal control system.

Referring now also to FIG. 4, there is shown a schematic block diagram of an optimal control circuit of a separately excited dc motor. A programmable, microprocessor-based optimal control is shown generally at reference numeral 71.

A wheel rotational speed reference signal $\omega_{wref}$ representing the desired value of wheel speed, enters a summer 58 via line 59. Also applied to summer 58 is a signal $\omega_w$ representative of the actual driven wheel rotational speed, which signal is generated by the encoder 43. Summer 58 produces an error wheel rotational speed $\omega_{werr}$ signal representing the difference between actual and desired wheel rotational speeds, $\omega_{werr} = \omega_{wref} - \omega_w$, which enters an armature voltage control amplifier 86 via line 63.

Armature voltage control amplifier 86 adjusts armature voltage $I_a$ 94, by controlling the chopper driving circuit 17 which causes the speed of motor 44 to vary. Encoder 43 is connected to drive unit 50 to sense angular rotational speed of the driven wheel(s) and to generate a continuous signal representative of such wheel speed $\omega_w$. This signal $\omega_w$ is fed back into summer 58.

The wheel rotational speed signal $\omega_w$ is simultaneously fed via line 98 into a feedback controller 66 such as a Model No. 68HC11 microprocessor manufactured by the Motorola Corp. Also simultaneously fed into feedback controller 66 via line 97 is field current signal $I_f$.

Exiting feedback controller 66 is a Laplace transform variable 1/k of a unit step function, where k is the optimal ratio constant, representing optimal armature current to field current ratio. This optimal ratio constant may be computed or obtained from a suitable look-up table in feedback controller 66. The Laplace transform 1/k enters a multiplier 62, to which is applied another operand over line 96, representing armature current $I_a$. A field reference current $I_{fref}$ is produced by multiplier 62, mathematically represented as $I_{fref} = I_a/k$.

Signal $I_{fref}$ is applied to a field current control amplifier 90 via line 99. Field current control amplifier 90 amplifies the field voltage $V_f$, which varies field current $I_f$ by controlling the H-bridge driving circuits 21, 23, 25 and 27. Field current $I_f$ is then re-applied to feedback controller 66 to obtain a new value of optimal ratio constant k.

As a new value of wheel rotational speed $\omega_w$ is produced and applied to summer 58, the cycle is repeated, thus providing optimal control over both the field and the armature and hence motor 44.

Figure 5:
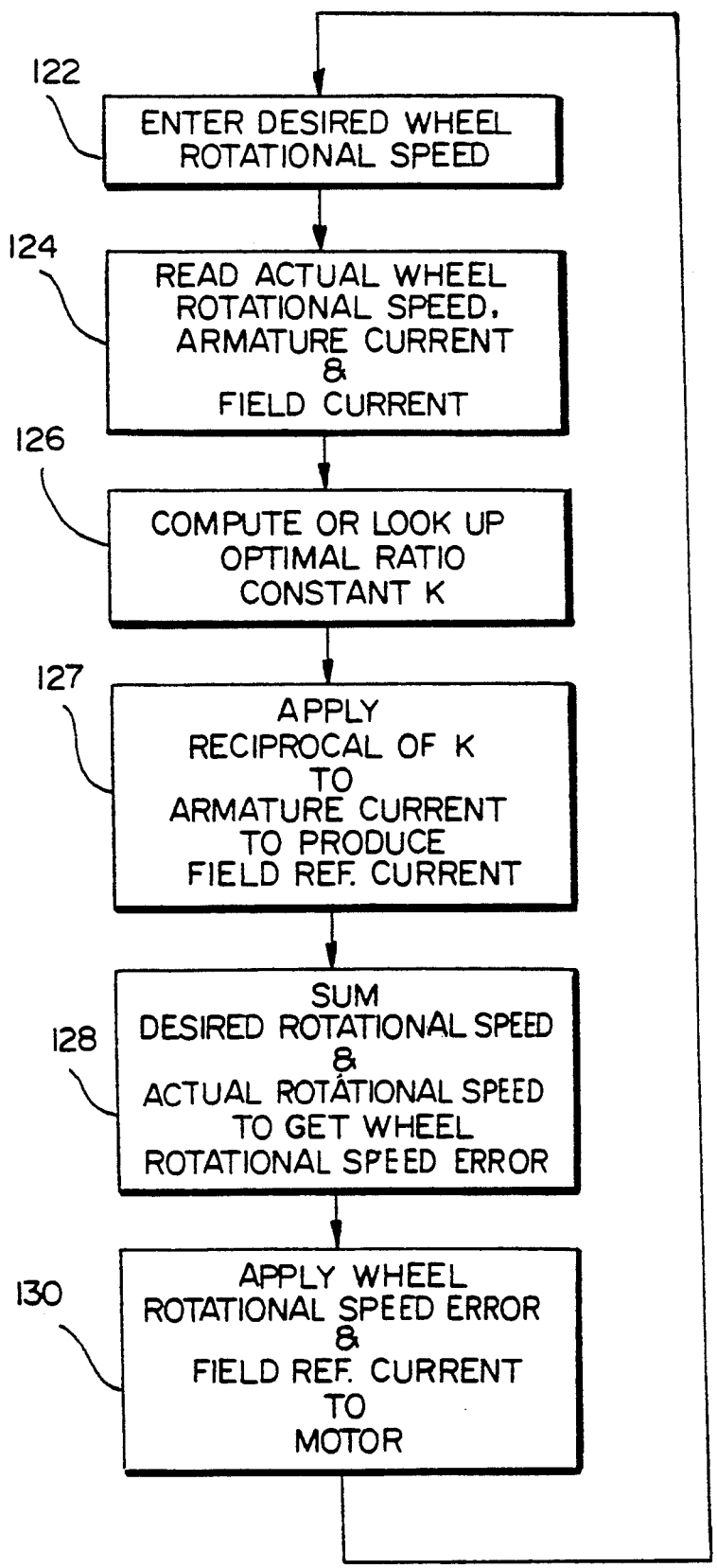
FIG. 5 is a flow chart of optimization control operation.

Referring now also to FIG. 5, there is shown flow chart of the optimization control circuit shown in FIG. 4.

The desired wheel rotational speed $\omega_{wref}$ is entered into summer 58 of optimal control 71, step 122. It should be noted that, when the vehicle is moving on a substantially straight line path, vehicle speed is easily derived from wheel speed once the radius "r" of the wheel is known. The relationship is:

$$\text{Vehicle speed} = 2 \pi r \omega_w$$

The actual wheel rotational speed $\omega_w$, armature current $I_a$ and field current $I_f$ are read, step 124.

The optimal ratio constant k is computed or obtained by look-up table, step 126, and the reciprocal thereof then applied to armature current $I_a$, step 127, to result in field reference current $I_{fref} = I_a/k$.

Wheel rotational speed error $\omega_{werr}$ is then computed by summing the desired wheel rotational speed $\omega_{wref}$ with the actual wheel rotational speed $\omega_w$ (i.e., $\omega_{werr} = \omega_{wref} - \omega_w$), step 128.

Wheel rotation speed error $\omega_{werr}$ and field current reference $I_{fref}$ are re-applied to the motor 44, step 130 and the cycle repeats.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. Apparatus for optimizing control of a dc motor of a vehicle having a driven wheel, said dc motor having separately excited armature and field windings, the apparatus comprising:
   a) a motor having an armature, an armature winding and a field winding, said windings being independently controlled;
   b) armature voltage amplifying means operatively connected to the armature of said motor for varying voltage applied thereto;
   c) armature current sensing means operatively connected to said armature voltage amplifying means for sensing armature current;
   d) field current amplifying means operatively connected to the field winding of said motor for varying current applied thereto;
   e) field current sensing means operatively connected to said field current amplifying means for sensing field current;
   f) speed sensing means positioned remote from the armature for generating a signal representative of the actual rotation speed of said driven wheel;
   g) means for providing a first reference signal proportional to actual wheel speed;
   h) means for providing a second reference signal proportional to actual armature current;
   i) means for providing a third reference signal proportional to desired field current; and
   j) optimizing control means for optimizing energy efficiency, the optimizing control means receiving said first and second reference signals, and for generating said third reference signal, said optimizing control means being operatively connected to said armature voltage amplifying means and to said field current amplifying means for controlling respective operations thereof.

2. The optimizing control apparatus of claim 1 wherein said optimizing control means comprises feedback controlling means.

3. The optimizing control apparatus of claim 2 wherein said field current sensing means generates a signal applied to said feedback controlling means.

4. The optimizing control apparatus of claim 3 wherein said speed sensing means generates said first reference signal, said first reference signal being applied to said feedback controlling means.

5. A method for optimizing a dc motor having separately excited armature and field windings, the steps comprising:
   a) reading a signal representative of desired wheel speed;
   b) reading signals representative of actual wheel speed, armature current and field current;
   c) providing a feedback controller for generating an optimal armature current to field current ratio;
   d) computing an optimal armature current to field current ratio;
   e) computing optimal field current control effort as a function of said signal representative of armature current and said optimal armature current to field current ratio; and
   f) computing optimal armature voltage control effort as a function of said signals representative of said desired wheel speed and said actual wheel speed.

6. The method for optimizing a dc motor of claim 5, the steps further comprising repeating steps (a)–(f) to update said computed optimal field current control effort and said armature voltage control effort.

7. Apparatus for optimizing control of a dc motor of a vehicle having a driven wheel, said dc motor having separately excited armature and field windings, the apparatus comprising:
   a) a motor having an armature, an armature winding and a fielding winding, said windings being independently controlled;
   b) armature voltage amplifying means operatively connected to the armature of said motor for varying voltage applied thereto;
   c) armature current sensing means operatively connected to said armature voltage amplifying means for sensing armature current;
   d) field current amplifying means operatively connected to the field winding of said motor for varying current applied thereto;
   e) field current sensing means operatively connected to said field current amplifying means for sensing field current;
   f) speed sensing means for generating a signal representative of the rotation speed of said driven wheel;
   g) means for providing a first reference signal proportional to actual wheel speed;
   h) means for providing a second reference signal proportional to actual armature current;
   i) means for providing a third reference signal proportional to desired field current; and
   j) optimizing control means for receiving said first and second reference signals, and for generating said third reference signal, said optimizing control means being operatively connected to said armature voltage amplifying means and to said field current amplifying means for controlling respective operations thereof, said optimizing control means comprising feedback controlling means and summing means for providing a control signal to said armature voltage amplifying means.

8. Apparatus for optimizing control of a dc motor of a vehicle having a driven wheel, said dc motor having separately excited armature and field windings, the apparatus comprising:
   a) a motor having an armature, an armature winding and a field winding, said windings being independently controlled;
   b) armature voltage amplifying means operatively connected to the armature of said motor for varying voltage applied thereto;
   c) armature current sensing means operatively connected to said armature voltage amplifying means for sensing armature current;

d) field current amplifying means operatively connected to the field winding of said motor for varying current applied thereto;

e) field current sensing means operatively connected to said field current amplifying means for sensing field current; and f) speed sensing means for generating a signal representative of the actual rotation speed of said driven wheel;

g) means for providing a first reference signal proportional to actual wheel speed;

h) means for providing a second reference signal proportional to actual armature current;

i) means for providing a third reference signal proportional to desired field current;

j) optimizing control means for receiving said first and second reference signals, and for generating said third reference signal, said optimizing control means being operatively connected to said armature voltage amplifying means and to said field current amplifying means for controlling respective operations thereof, said optimizing control means comprising feedback controlling means, said field current sensing means generating a signal applied to said feedback controlling means, said speed sensing means generating said first reference signal, said first reference signal being applied to said feedback controlling means, and a constant 1/k being derived from said feedback controlling means and being multiplied by said second reference signal to generate said third reference signal, said third reference signal being applied to said field current amplifying means.

* * * * *